(12) United States Patent
Shimbo et al.

(10) Patent No.: US 6,388,844 B1
(45) Date of Patent: May 14, 2002

(54) HEAD BASE SHIFT MECHANISM IN CASSETTE TAPE RECORDER OF AUTOMATIC REVERSE TAPE

(75) Inventors: Takaichi Shimbo, Iruma; Masayuki Goto, Fussa, both of (JP)

(73) Assignee: MEC Co., Ltd., Tokyo (JP)

( * ) Notice: Subject to any disclaimer, the term of this patent is extended or adjusted under 35 U.S.C. 154(b) by 0 days.

(21) Appl. No.: 09/471,479

(22) Filed: Dec. 23, 1999

(30) Foreign Application Priority Data

Oct. 4, 1999 (JP) .......................................... 11-282242

(51) Int. Cl.[7] .......................... G11B 21/22; G11B 5/54; G11B 21/16; G11B 5/48
(52) U.S. Cl. ..................................... 360/250; 360/241.3
(58) Field of Search ............................... 360/FOR 205, 360/240, 250, 251, 251.1, 251.2, 241, 241.3, 96.2; 242/354, 354.1, 354.2, 340; 226/110

(56) References Cited

U.S. PATENT DOCUMENTS

| | | | |
|---|---|---|---|
| 3,533,633 A | 10/1970 | Wilder | 360/74.1 |
| 3,659,859 A | * 5/1972 | Marcinkus | 360/92 |
| 3,684,209 A | 8/1972 | Wada | 242/333 |
| 3,716,242 A | * 2/1973 | Maruyama | 360/90 |
| 3,869,723 A | 3/1975 | Yoshida | 360/96.2 |
| 4,159,492 A | 6/1979 | Ban et al. | 360/74.3 |
| 4,896,234 A | * 1/1990 | Watanabe et al. | 360/251.3 |
| 4,935,831 A | 6/1990 | Shimbo | 360/251.2 |
| 5,276,567 A | 1/1994 | Ohashi et al. | 360/69 |
| 5,450,275 A | 9/1995 | Kunze et al. | 360/96.3 |
| 5,452,160 A | 9/1995 | Sakuma et al. | 360/251.2 |
| 5,765,741 A | 6/1998 | Kunze et al. | 226/50 |
| 5,816,521 A | 10/1998 | Kunze et al. | 242/356 |
| 6,105,892 A | * 8/2000 | Shimbo et al. | 242/354.1 |

FOREIGN PATENT DOCUMENTS

EP 047552 3/1982

* cited by examiner

Primary Examiner—Hoa T. Nguyen
Assistant Examiner—Julie Anne Watko
(74) Attorney, Agent, or Firm—Rothwell, Figg, Ernst & Manbeck

(57) ABSTRACT

Disclosed is a head base shift mechanism in an auto-reverse cassette tape recorder comprising a motor (2); a chassis (1) with a pair of capstans (41), (41') rotatable in forward and reverse directions; a head base (15) slidably mounted on the chassis and carrying at least a head (16) substantially at a center of the head base; a pair of pinch rollers (17), (17') for forward play and reverse play arranged in a substantially symmetric design at opposite sides of the head; spring means (23) for biasing the head base toward a stand-by position remote from a tape running plane (T) defined by and between the capstans; a pair of engagement members (272), (272') engageable with the head base at a point offset from a center line (X) of the chassis; and rotation transmission means (10) for moving one of the engagement members, selected depending upon the direction of rotation of the motor, while in engagement with the head base at the offset point, thereby moving the head base from the stand-by position (FIG. 1) toward the tape running plane. The head base at the stand-by position is shifted toward the tape running plane, against the biasing force of the spring means, in one of oppositely oblique directions due to engagement with a selected one of the engagement members, so that one of the pinch rollers is pressed against a corresponding one of the capstans, while the other pinch roller remains uncontact with the other capstan.

11 Claims, 13 Drawing Sheets

HEAD BASE SHIFT MECHANISM IN CASSETTE TAPE RECORDER OF AUTOMATIC REVERSE TAPE

BACKGROUND OF THE INVENTION

1. Field of the Invention

The present invention relates in general to a cassette tape recorder of automatic reverse type. More particularly, the present invention relates to a shift mechanism for a head base carrying a head and a pair of pinch rollers at opposite sides of the head. The shift mechanism of the present invention allows the base plate to move in an oblique direction so that a selected one of the pinch rollers is pressed against a corresponding capstan while the other pinch roller remains uncontact with its corresponding capstan.

2. Description of the Prior Art

In a typical auto-reverse mechanism of a conventional type, each pinch roller is assembled in a housing which may be moved by a push member slidably mounted on a head base. When the push member is moved in one direction, one of the pinch roller housings is moved to be in press-contact with one of flywheels so that a tape is running in one direction for forward play. When the push member is moved in an opposite direction, another pinch roller housing becomes in press-contact with another flywheel so that the tape is running in an opposite direction for reverse play.

This conventional mechanism requires separate housings and push members for each of the pinch rollers, which increases the number of parts in the cassette tape recorder and, therefore, has a large size with a complex structure. It should be manufactured at a higher cost.

The present inventor proposed a cassette tape drive apparatus in the U.S. Pat. No. 4,935,831 which includes a projection at a leading end of a rotary bar driven by a motor, and a pair of arms engageable with the projection. While one of the arm rotates due to engagement with the leading end of the rotary bar, a head base is moved from its stand-by position toward a tape running plane. This mechanism, however, only allows parallel movement of the head base, and requires another mechanism for movement of a pinch roller.

SUMMARY OF THE INVENTION

Accordingly, it is a principal object of the present invention to obviate the above-described disadvantages of the conventional auto-reverse mechanism in a cassette tape recorder.

Another object of the present invention is to provide a head base shift mechanism of a novel and simple construction in an auto-reverse mechanism, which can be manufactured by addition of the minimum number of parts to a one-way drive mechanism.

Still another object of the present invention is to provide a mechanism of a compact design for shifting a head base carrying a head and a pair of pinch rollers at opposite sides of the head, in one of oppositely oblique directions to be selected upon a tape running direction.

In accordance with an aspect of the present invention, there is provided a head base shift mechanism in a cassette tape recorder of automatic reverse type, comprising a motor; a chassis with a pair of capstans rotatable in forward and reverse directions; a head base slidably mounted on the chassis and carrying at least a head substantially at a center of the head base; a pair of pinch rollers for forward play and reverse play arranged in a substantially symmetric design at opposite sides of the head; spring means for biasing the head base toward a stand-by position remote from a tape running plane defined by and between the capstans; a pair of engagement members engageable with the head base at a point offset from a center line of the chassis; and rotation transmission means for moving one of the engagement members, selected depending upon the direction of rotation of the motor, while in engagement with the head base at the offset point, thereby moving the head base from the stand-by position toward the tape running plane. The head base at the stand-by position is shifted toward the tape running plane, against the biasing force of the spring means, in one of oppositely oblique directions due to engagement with a selected one of the engagement members, so that one of the pinch rollers is pressed against a corresponding one of the capstans, while the other pinch roller remains uncontact with the other capstan.

In a preferable embodiment of the present invention, the chassis has a longitudinal groove along its center axis, into which a projection on the bottom of the head plate is received. In this embodiment, while the head base is moved from the stand-by position toward the tape running plane, the projection moves along the groove and acts as a pivot for slight rotation of the head base to guide the head base to be moved in the oblique direction.

In a modified embodiment, the chassis has a projection on its center axis, which is received in a longitudinal groove on the top surface of the head plate. Likewise, in this embodiment, while the head base is moved from the stand-by position toward the tape running plane, the projection moves along the groove and acts as a pivot for slight rotation of the head base to guide the head base to be moved in the oblique direction.

In each of the above-described embodiments, the projection preferably also act as a pivot for rotation of the head base at an extreme position in the longitudinal groove, which increases a contact pressure between the selected pinch roller and its corresponding capstan opposed thereto and, at the same time, separates the other pinch roller from its corresponding capstan.

In another embodiment of the present invention, the head base shift mechanism further comprises guide means for allowing slight rotation of the head base during movement from the stand-by position toward the tape running plane. The guide means comprises an upstanding member on the chassis and a guide groove formed at an upper end portion of the head base for receiving the upstanding member with a play in width. Specifically, the upstanding member engages a right-side edge of the guide groove while the head base moves in a right upward direction, whereas it engages a left-side edge of the guide groove while the head base moves in a left upward direction. Thus, an angle of oblique direction of movement of the head base is defined by engagement of the upstanding member and one of opposite edges of the guide groove. In a preferable application, the rotation transmission means still operates to move the head base after the selected pinch roller becomes contact with its corresponding capstan, so that the head base tends to rotate, substantially about a contact point between the selected pinch roller and the capstan, in a direction opposite to that during preceding movement from the stand-by position, thereby releasing the upstanding member from contact with the edge of the guide groove.

In still another embodiment of the present invention, the rotation transmission means comprises a switch arm driven by the motor to swing about a pivot on the center axis of the chassis, a pair of operating arms arranged symmetrically at opposite sides of the center axis of the chassis, each operating arm having a pivot base end and a leading end engageable with an end portion of the switch arm and including the engagement member. In this embodiment, when the switch arm swings in one direction, one of the operating arms rotates due to engagement between the leading end of the said operating arm and the end portion of the switch arm, which, in turn, moves the head base due to engagement with the engagement member of the said operating arm.

In another preferable embodiment, the head base shift mechanism of the present invention further comprises a lock means for retaining the head base in a lock position where one of the pinch rollers is in press-contact with its corresponding capstan. In this embodiment, each operating arm has a forked leading end with an inner projection and an outer projection of greater extension than the inner projection. The end portion of the switch arm engages with the outer projection while the head base is moved from the stand-by position toward the tape running plane. The end portion of the switch arm engages with the inner projection to unlock the head base from the lock position defined by the lock means.

In still another embodiment of the present invention, the chassis has a guide opening having a base end portion and a pair of oblique grooves extending from the base end portion in opposite oblique directions to separate from each other as they extend, a select boss movably received within the guide opening and a projection driven by the motor to move the select boss within the base end portion toward the lower end of one of the oblique grooves. This arrangement will specify one of the oblique directions during movement of the head base from the stand-by position. In this embodiment, the rotation transmission means preferably comprises a switch arm driven by the motor to swing about a pivot on the center axis of the chassis, a pair of operating arms arranged symmetrically at opposite sides of the center axis of the chassis, each operating arm having a pivot base end and a leading end engageable with a first end portion of the switch arm and including the engagement member. The projection that moves the select boss is formed as a second end portion of the switch arm opposite to the first end portion.

BRIEF DESCRIPTION OF THE DRAWINGS

Other objects and advantages of the present invention can be better understood from the following description when read in conjunction with the accompanying drawings in which.

DETAILED DESCRIPTION OF THE PREFERRED EMBODIMENTS

Figure 1:
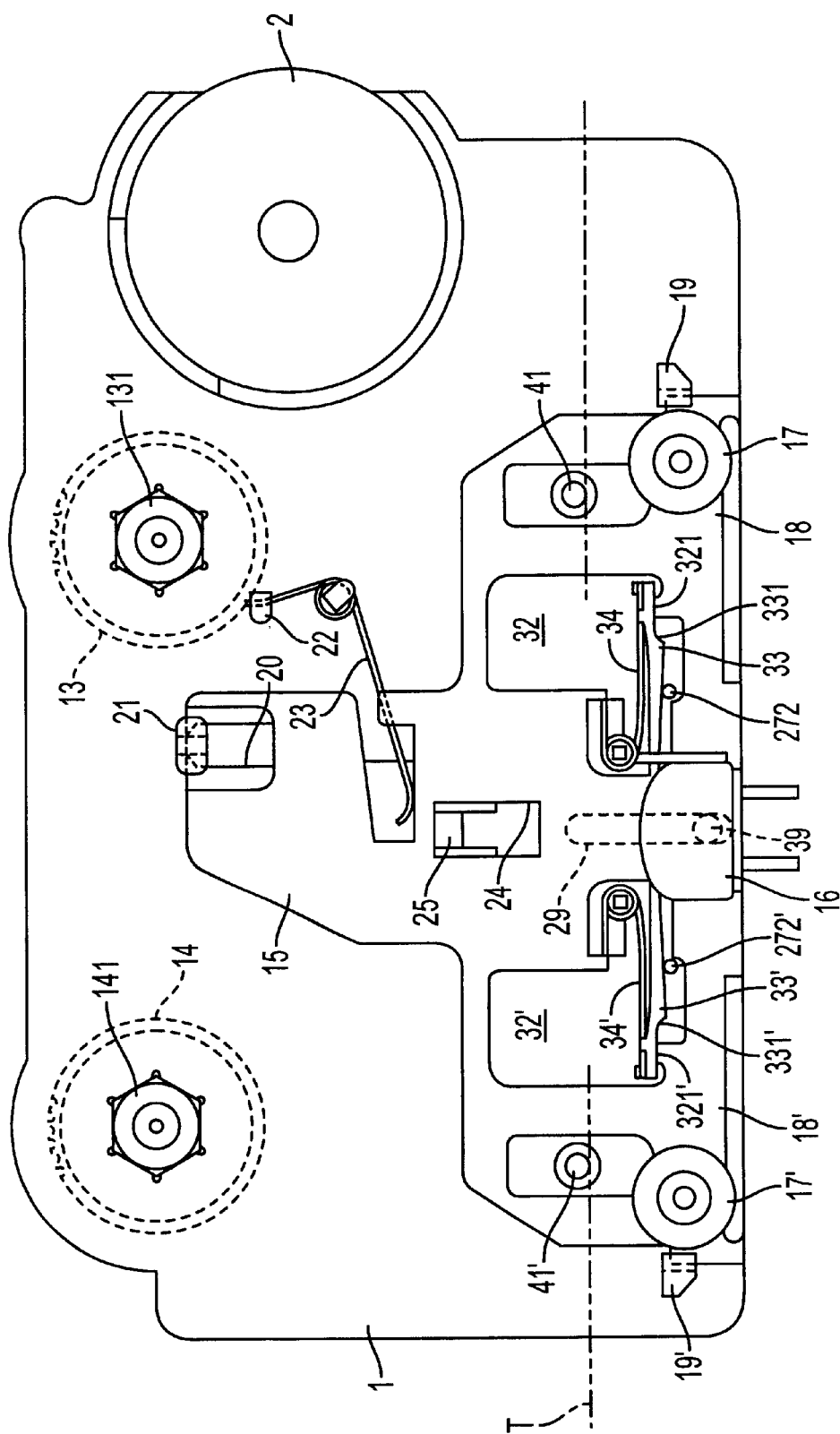
FIG. 1 is a plan view of a cassette tape recorder of automatic reverse type including a head base shift mechanism in accordance with an embodiment of the present invention in which a head base is in a stand-by position.
Figure 2:
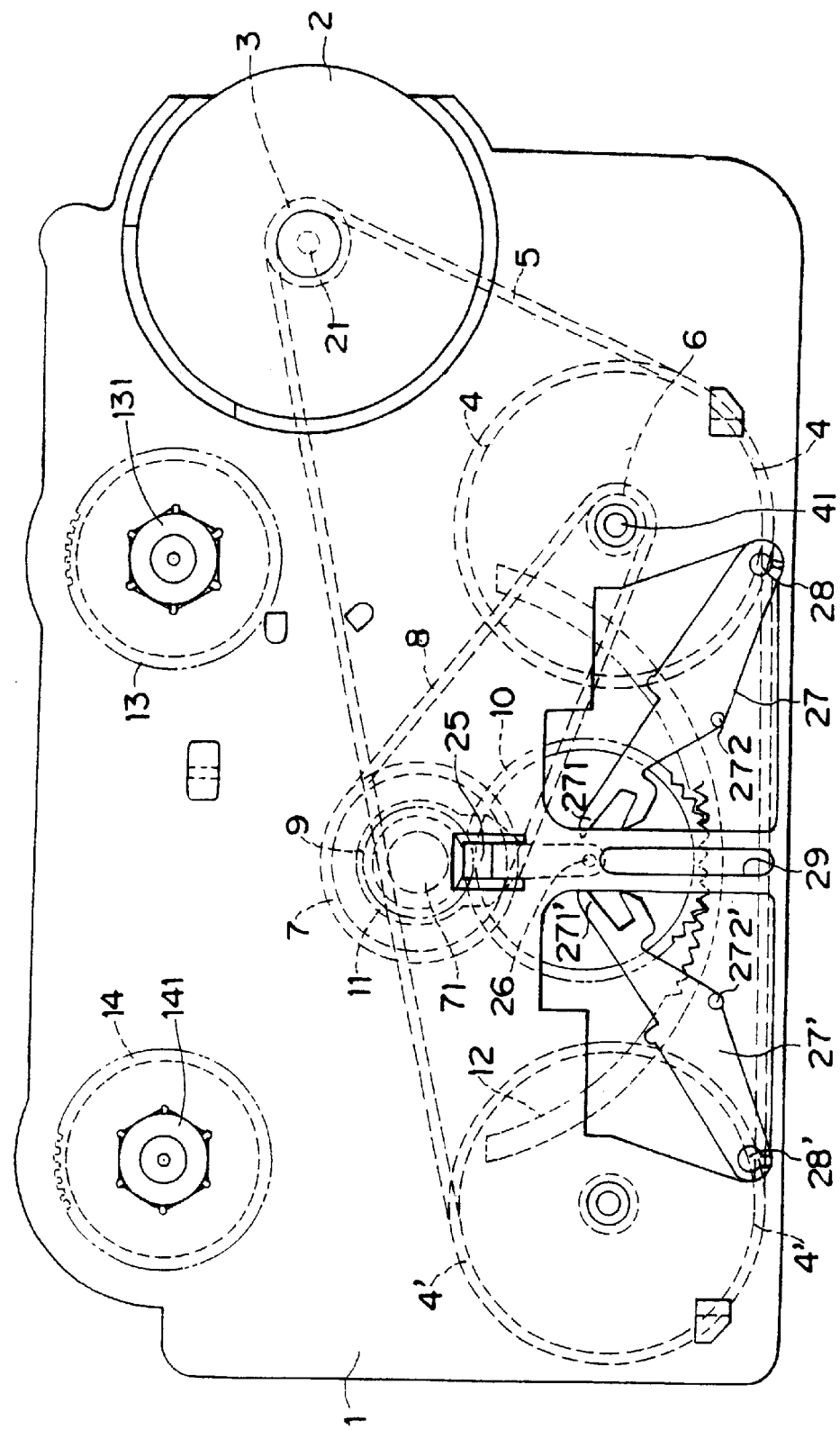
FIG. 2 is a plan view of the cassette tape recorder of FIG. 1 from which the head base is removed.
Figure 3:
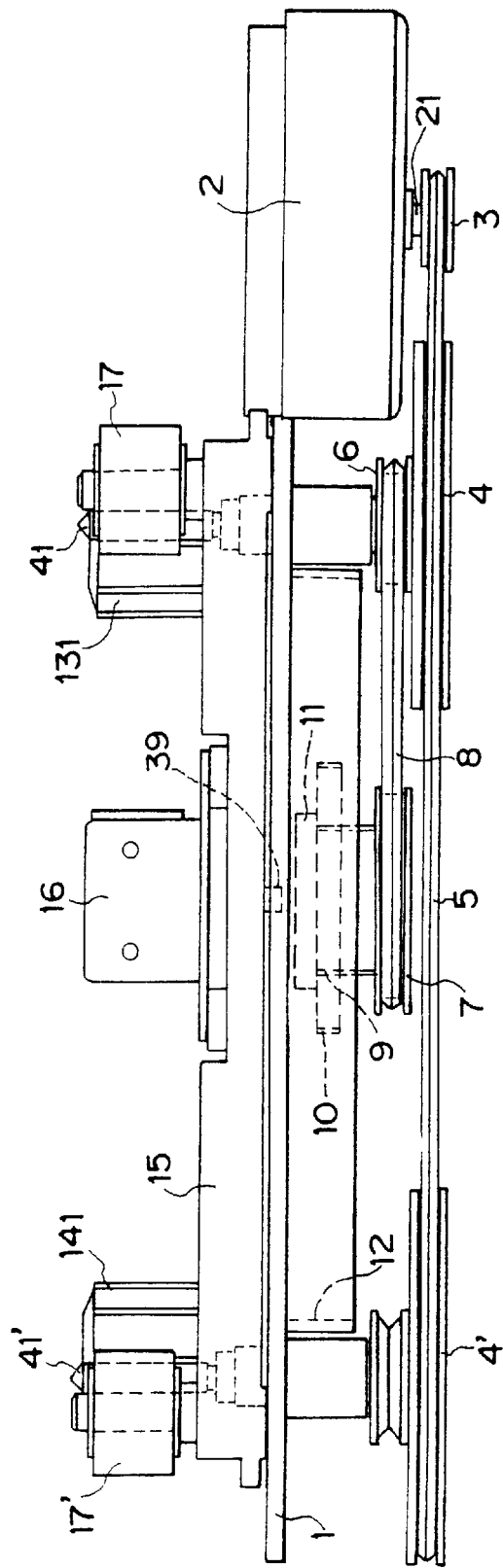
FIG. 3 is a side view of the cassette tape recorder of FIG. 1.

Specifically referring to FIGS. 1–3 illustrating a head base shift mechanism in a cassette tape recorder of automatic reverse type (hereinbelow referred to as "auto-reverse tape recorder" or simply "tape recorder") in accordance with an embodiment of the present invention, a chassis 1 carries a motor 2 rotatable in forward and reverse directions. A main belt 5 is wrapped between an output shaft 21 of motor 2 and a pair of flywheels 4', 4'. A second belt 8 is wrapped between a small-diameter pulley 6 concentrically secured to flywheel 4 and a center pulley 7. A rotation transmission gear 10 is rotatably connected to an extension of a switch arm 11 which is rotatable about a shaft 71 of center pulley 7. A center pulley gear 9 is secured to shaft 71 and in mesh with rotation transmission gear 10 which, in turn, meshes with a semi-circular inner gear 12 formed on the underside of chassis 1 concentrically with center pulley gear 9.

With the above-described arrangement, when motor 2 rotates in a forward direction or in a counterclockwise direction in FIGS. 1 and 2, its rotation is transmitted via belts 5, 8 to center pulley 7 and the said pulley to rotate in the same direction, so that rotation transmission gear 10 revolves clockwise and moves to the right along inner gear 12. On the other hand, when motor rotates in a reverse direction or in a clockwise direction in FIGS. 1 and 2, rotation transmission gear 10 revolves counter clockwise and moves to the left along inner gear 12.

At the leading end of the extension of switch arm 11, there is provided an upward projection pin 26 which is concentric with a shaft of rotation transmission gear 10. Pin 26 is engageable with a forked end 271, 271' of one of a pair of lock arms 27, 27' rotatable respectively about shafts 28, 28' on chassis 1. Each lock arm 27, 27' has an upward projecting lock pin 272, 272'.

Most of the afore-mentioned parts and elements are arranged below chassis 1.

A head base 15 is slideable above chassis 1 and comprises substantially an inverted T-shape plate with a pair of lower side extensions 18, 18' carrying a head 16 and a pair of pinch rollers 17, 17' at opposite sides of head 16, and a central upper extension. Head base 15 may be moved from a stand-by position shown in FIGS. 1 and 2 toward an operative position in which the tape recorder is ready to forward or reverse play, in a slanted orientation with respect to a center line X (FIG. 4) of chassis 1. In the operative position of head base 15 for forward play, pinch roller 17 is in press-contact with a capstan 41 planted on chassis so as to convey a tape (not shown) in a forward direction. Likewise, during the reverse play operation, pinch roller 17' is in press-contact with a capstan 41' so as to convey a tape (not shown) in a reverse direction. Capstans 41, 41' are arranged in a symmetric design with respect to the center line X.

Opposite edges of side extensions 18, 18' are engaged by abutment pieces 19, 19' of L-shaped cross-section upstanding from chassis 1 to allow coplanar sliding movement of head base 15 with respect to chassis 1. The upper end portion of head base 15 is cut out to form a guide groove 20 which receives another abutment piece 21 of T-shaped cross-section upstanding from chassis 1, which specifically guides this direction and orientation of movement of head base 15. At a center of head base 15, there is formed a rectangular window 24 having an upper edge which mates with a claw 25 of chassis 1 when head base 15 rests in the stand-by position of FIGS. 1 and 2. It is noted that these engagements are designed not tightly but with some play in width direction to allow head base 15 to move substantially vertically (as viewed in FIGS. 1 and 2) but in a slightly slanted orientation, which will be described hereinlater in much more detail.

A projection 39 on the underside of head base 15 is received in a vertically elongated guide groove 29 on the surface of chassis 1. Projection 39 has a diameter substantially equal to the inner width of guide groove 29. During movement of head base 15, projection 39 moves along guide groove 29 and acts as a pivot for rotation of head base 15. Head base 15 is normally biased downward by a spring 23 connected between a hook 22 on chassis 1 and a cut-out (not indexed) of head base 15. Spring 23 cooperates with stopper means comprising claw 25 in engagement with the upper edge of window 24, to hold head base 15 in the stand-by position of FIGS. 1 and 2.

Figure 6:
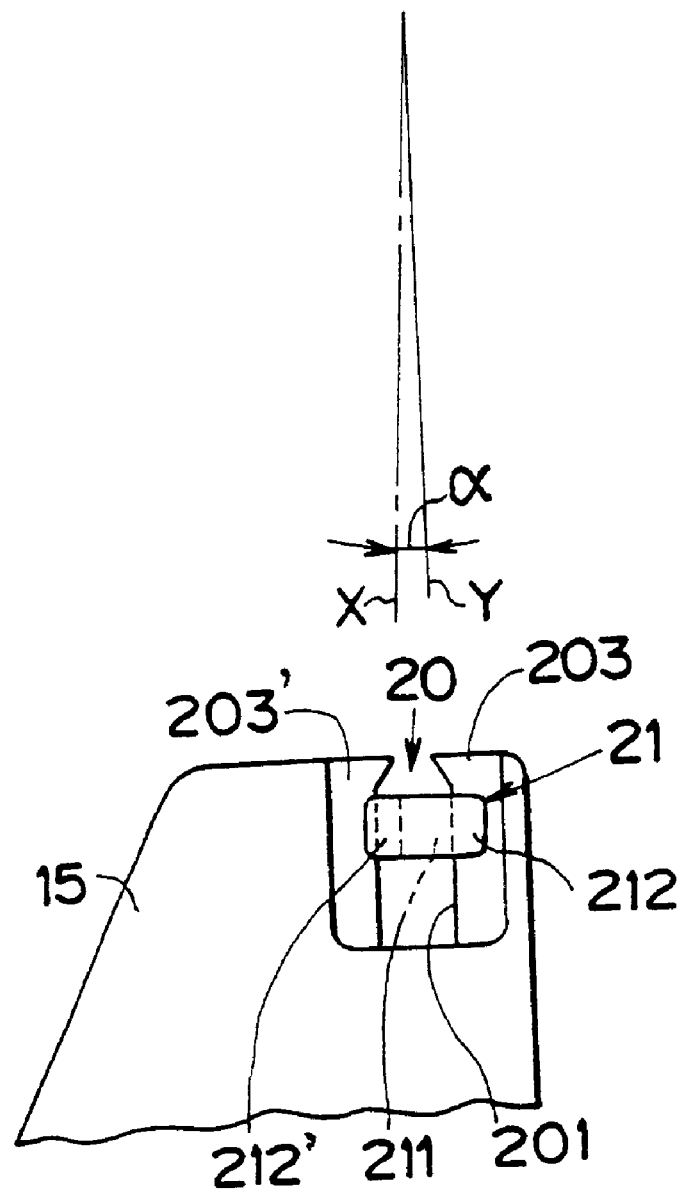
FIG. 6 is an explanatory view showing positional relationship between a guide groove of the head base and an upstanding projection which should appear just before the lock condition shown in FIG. 5 is obtained.

Abutment piece 21 has a downward projecting leg 211 and a pair of opposed side extensions 212, 212' projecting outwardly from the top of leg 211 (as shown in FIG. 6). At opposite sides of guide groove 20, the upper end portion of head base 15 has a pair of opposed recessed platforms 203, 203' (FIG. 6) along which side extensions 212, 212' of abutment piece 21 may be slid. Each of platforms 203, 203' has a lowered level than the surrounding portion of head base 15, which corresponds to the thickness of side extensions 212, 212'.

A pair of reel beds 131, 141 are integral with reel bed gears 13, 14, respectively. Reel bed 131 rotates counter-clockwise (as viewed in FIGS. 1 and 2) during forward play operation, whereas reel bed 141 rotates clockwise (as viewed in FIGS. 1 and 2) during reverse play operation.

Each side extension of head base 15 has an opening 32, 32'. A pair of lateral extending press arms 33, 33' are integrally formed with head base 15 so that they may provide elastic movement with respect to shoulders 321, 321'. More particularly, press arms 33, 33' are usually biased downward by springs 34, 34' so that they contact under pressure with shoulders 321, 321' when head base 15 rests in the stand-by position of FIGS. 1 and 2. In this position, lock pins 272, 272' of lock arms 27, 27' are positioned in contact with the lower edges of press arms 33, 33'. FIG. 1 shows lock pins 272, 272' but omits lock arms 27, 27'. At the lower edges of end portions of press arms 33, 33', there are formed arcuate recess 331, 331' which may engage lock pins 272, 272' for retaining head base 15 in the operative position.

FIGS. 1 and 2 shows the tape recorder in which head base 15 is in the stand-by position and rotation transmission gear 10 is in a lowermost or neutral position, that is at a center of its semicircular path of travel along inner gear 12. In this position of gear 10, neither of forked ends 271, 271' of lock arms 27, 27' engage with pin 26. In the stand-by position of head base 15, each pinch roller 17, 17' is remote from corresponding capstan 41, 41' and head 16 is retracted below from the tape running plane T.

When motor 2 is driven to rotate counter-clockwise or in a forward direction, as described before, its rotation is transmitted via main belt 5, flywheels 4, 4', sub-belt 8, center pulley 7 and center pulley gear 9 to rotation transmission gear 10 which, therefore, mates with inner gear 12 to rotate counter-clockwise about shaft 71 of center pulley 7, while revolving itself clockwise.

Figure 4:
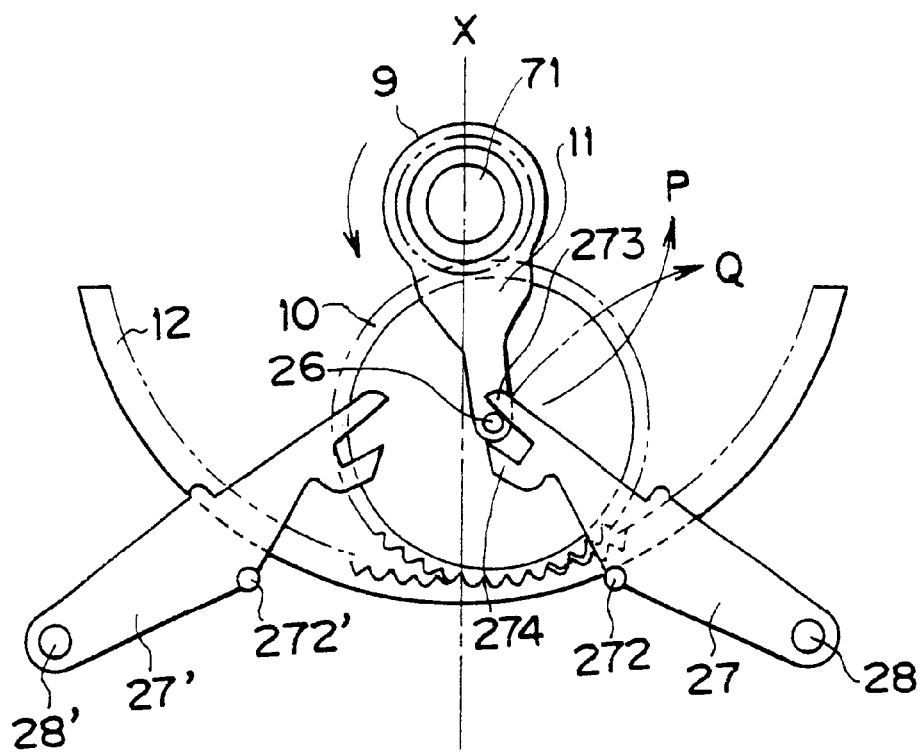
FIG. 4 is an explanatory view showing engagement between a switch arm and a forked end of one of lock arms in the cassette tape recorder of FIG. 1.

Soon after rotation transmission gear 10 starts travelling along inner gear 12 in a counter-clockwise direction from the position shown in FIGS. 1 and 2, pin 26 of switch arm 11 brings into engagement with an outer greater projection 273 of forked end 271 of the righthand lock arm 27, as shown in FIG. 4. Accordingly, lock arm 27 starts rotating clockwise about shaft 28. The moving path of pin 26 is shown by an arrow P, whereas the moving path of lock arm's end 271 is shown by an arrow Q. Since lock pin 272 of lock arm 27 is positioned in contact with the lower edge of press arm 33 which is integral with head base 15, clockwise rotation of lock arm 27 causes press arm 33 to move upward, thereby elevating head base 15 toward the tape running plane T against the downward biasing force of spring 23.

The movement of head base 15 is guided by engagement between projection 39 and guide groove 29. Since a contact point between lock pin 272 and press arm 33 is offset to the right with respect to the center line X of chassis 1, head base 15 tends to be rotated about projection 39 so that it moves in a rightward slanted orientation. As described before, engagement between side extensions 18, 18' and abutment pieces 19, 19', engagement between window 24 and claw 25, and engagement between guide groove 20 and abutment piece 21 are all designed in a loosened fashion with a small play in width, which allow the slanted orientation of head base 15 during substantially vertical movement.

Figure 5:
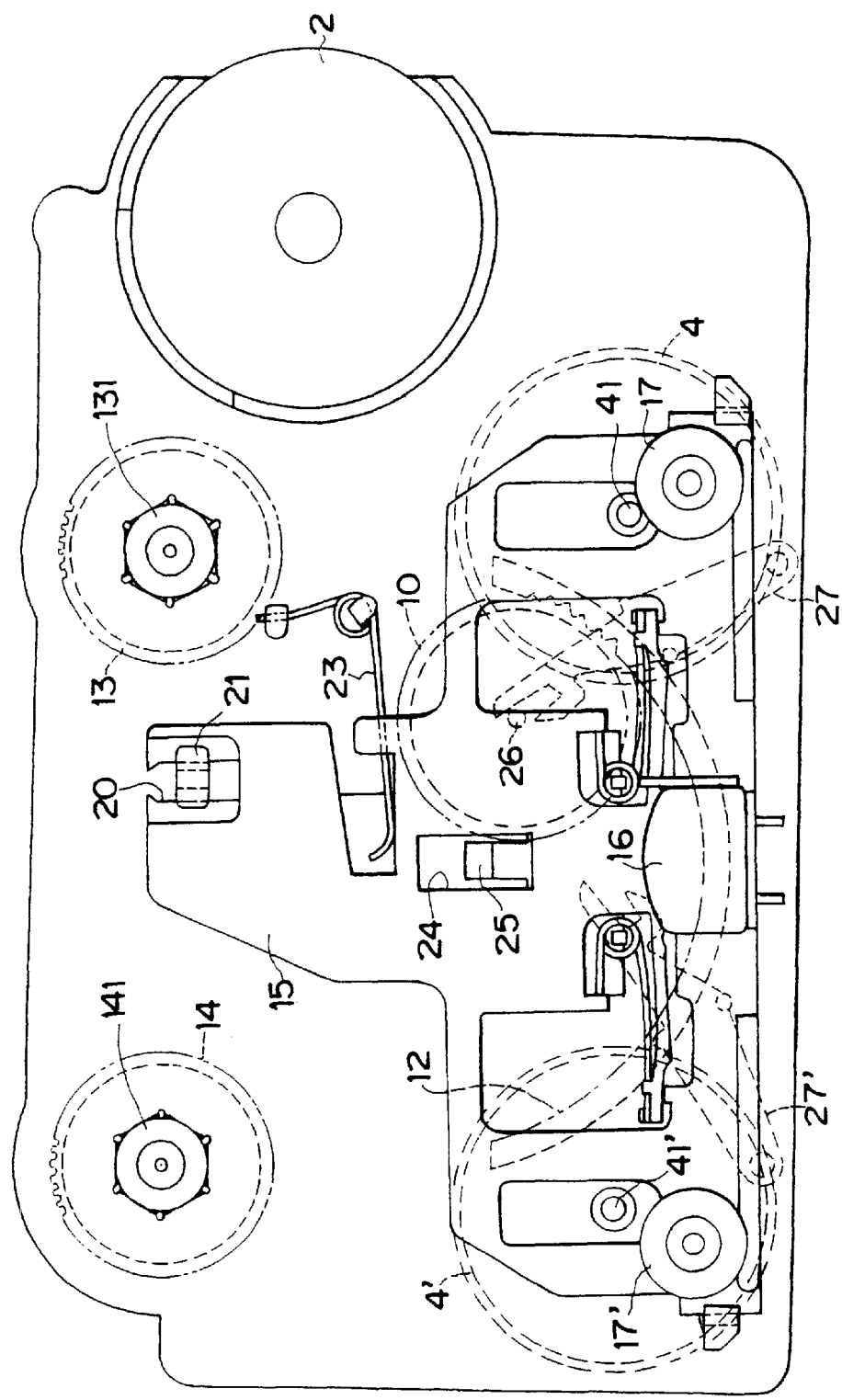
FIG. 5 is a plan view of the cassette tape recorder of FIG. 1 in which the head base is retained in a right upward lock position by engagement shown in FIG. 4.

By such vertical movement of head base 15 in a rightward slanted orientation, pinch roller 17 comes into contact with capstan 41 whereas pinch roller 17' is still remote from capstan 41'. After that, rotation transmission gear 10 continues to rotate counterclockwise along its travel path P, so that lock pin 272 of lock arm 27 comes into engagement with recess 331 of lock arm 33 (FIG. 5). Lock arm 27 is retained in this position by spring 34, because pin 26 soon separates from outer projection 273 of forked end 271 of lock arm 27. Thus, head base 15 is held in the operative position shown in FIG. 7 for forward play operation.

Due to slight rotation of transmission gear 10 between when lock pin 272 is brought into engagement with recess 331 and when pin 26 separates from outer projection 273, head base 15 becomes apt to move further from the position shown in FIG. 5. However, at this time, projection 39 has already reached the upper extreme position in guide groove 29, which prevents further elevation of head base 15 and retains the same in the position of FIG. 5.

Referring again to FIG. 7, by still further rotation of pin 26 in the arrowed direction P, rotation transmission gear 10 separates from inner gear 12 and, instead, mates with forward reel bed gear 13 to rotate the same in a counter-clockwise direction. Accordingly, a tape (not shown) in a cassette (not shown) is unreeled and engaged between pinch roller 17 and capstan 41 integral with flywheel 4 to be conveyed in a forward direction. Another pinch roller 17' is remote from its corresponding capstan 41' which idles with flywheel 4'.

The above-described movement of head base 15 will be described in more detail in reference to FIG. 6. When pin 26 in engagement with outer projection 273 of lock arm 27 begins to rotate counter-clockwise along the travel path P (FIG. 4), offset engagement between lock pin 272 and press arm 33 will cause head base 15 to rotate counter-clockwise about projection 39 in guide groove 29. However, as particularly seen in FIG. 1, abutment piece 21 of T-shape cross-section has a downward projecting leg 211 which is substantially tightly received within a narrowed channel of guide groove 20. This means that, at the starting phase of movement, head base 15 moves straightway along the center line X of chassis 1. Then, after leg 211 has passed the narrowed channel of guide groove 20, head base 15 becomes apt to rotate counter-clockwise about projection 39 and moves toward the tape running plane T in a rightward slanted or inclined orientation with respect to the chassis center line X. Consequently, leg 211 is moved along a righthand edge 201 of groove 20, as can be seen in FIG. 6.

When pin 26 further rotates counter-clockwise along the travel path P after the positional relationship between guide groove 20 and abutment piece 21 shown in FIG. 6 is obtained, head base 15 is moved upwardly in a predetermined slanted orientation with a constant angle a defined between an extension Y of righthand edge 201 and the chassis center line X, because engagement of leg 211 with righthand edge 201 prevents further counter-clockwise rotation of head base 15 about projection 39.

Such movement of head base 15 in a predetermined slanted orientation will continue until pinch roller 17 becomes in contact with its corresponding capstan 41. At the time when pinch roller 17 collides upon capstan 41, projection 39 on the underside of head base 15 does not reach the upper extreme end of guide groove 29 on chassis 1. Accordingly, head base 15 still tends to be moved along with continuous rotation of transmission gear 10 and lock arm 27. During this movement, head base 15 is apt to be rotated clockwise about a contact point between pinch roller 17 and capstan 41, so that leg 211 of abutment piece 21 becomes disengaged from righthand edge 201 of groove 20 before when lock pin 272 of lock arm 27 comes into engagement with recess 331 of lock arm 33. Thus, head base 15 remains uncontact with abutment piece 21 in the forward operative position shown in FIG. 5. This allows head base 15 to be again rotated counter-clockwise about projection 39 when it reaches and remains in the upper extreme position in guide groove 29, which improves a contact pressure between pinch roller 17 and capstan 41 for smooth tape conveyance. Slight rotation of head base 15 about projection 39 in the upper extreme position in groove 29 will also make sure that the other pinch roller 17' remains uncontact with capstan 41'. Then, lock pin 272 becomes engaged with recess 331 so that head base 15 is held in the forward operative position of FIG. 7.

In summary, during movement of head base from the stand-by position of FIGS. 1 and 2 to the forward operative position of FIG. 5, head base 15 is moved along with rotation of pin 26 in the arrowed direction P in the sequential phases comprising:

(a) wherein it moves substantially along the center line X of chassis 1 as far as leg 211 of abutment piece 21 is engaged within the narrowed channel of guide groove 20;

(b) wherein it slightly rotates counterclockwise about projection 39 in guide groove 29 until leg 211 contacts the righthand edge of groove 20;

(c) wherein it moves in a predetermined slanted orientation defined by engagement between leg 211 and the righthand edge of groove 20 until pinch roller 17 becomes in contact with capstan 41;

(d) wherein it slightly rotates clockwise about a contact point between pinch roller 17 and capstan 41 to separate leg 211 from the righthand edge of groove 20 until projection 39 reaches the upper extreme end of groove 29; and (e) wherein it slightly rotates counterclockwise again about projection 39 in the upper extreme end of groove 29 to strengthen a contact pressure between pinch roller 17 and capstan 41 until it is locked in the forward operative position of FIG. 5.

Figure 7:
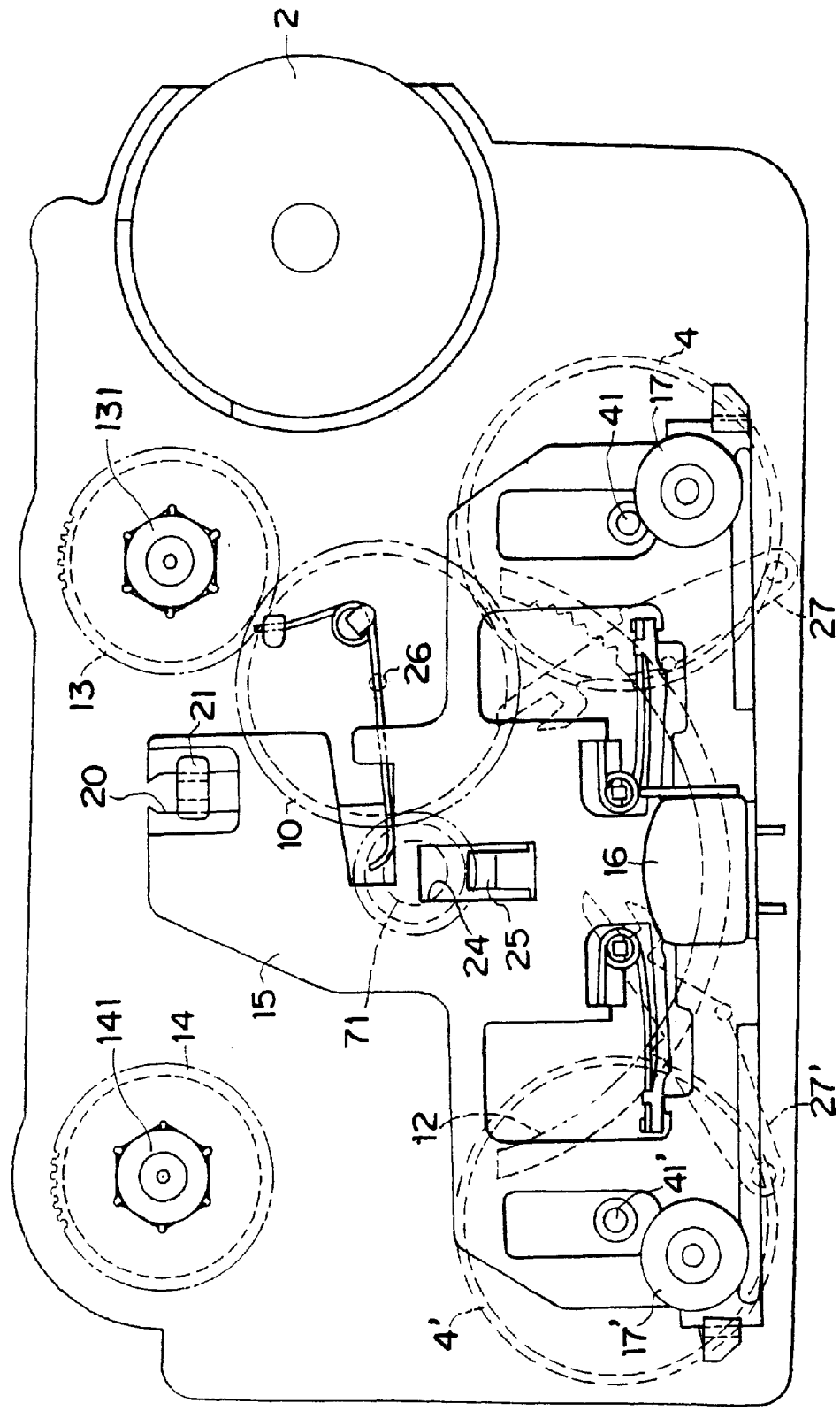
FIG. 7 is a plan view of the cassette tape recorder of FIG. 1 which is ready for forward play.

After the phase (e), head base 15 is held in the forward operative position of FIG. 5 even by further counterclockwise rotation of pin 26 so that the tape recorder is ready for the forward play operation as shown in FIG. 7.

In the operative position shown in FIG. 7, the forward play may be done. When the tape end is detected by a sensor (not shown), motor 2 begins to rotate in a reverse direction, that is in a clockwise direction in FIG. 7. In an opposite manner to that described before, transmission gear 10 rotates clockwise along inner gear 12, and pin 26 pushes outer projection 271 of lock arm 27 to disengage lock pin 272 from recess 331. Accordingly, lock arm 27 is released from its locked condition and head base 15 is returned to the stand-by position of FIGS. 1 and 2 in an instant by the downward biasing force of spring 23.

During further reverse rotation of motor 2, transmission gear 10 in mesh with center pulley gear 9 and inner gear 12 rotates clockwise, while revolving itself counterclockwise. This causes the lefthand lock arm 27' to rotate counterclockwise about shaft 28', which moves head base 15 toward the tape running plane T in a leftward slanted orientation until it reaches the reverse operative position shown in FIG. 8 where lock pin 272' of lock arm 27' engages with recess 331'. Motor 2 continues reverse rotation so that transmission gear 10 leaving from the left-uppermost end of inner gear 12 becomes in mesh with reverse reel bed gear 14, which begins to rotate clockwise for unreeling the tape, as shown in FIG. 9. The tape is engaged between pinch roller 17' and capstan 41' integral with flywheel 4' to be conveyed in a reverse direction. In the reverse play operation, pinch roller 17 is remote from its corresponding capstan 41 which idles with flywheel 4.

Figure 8:
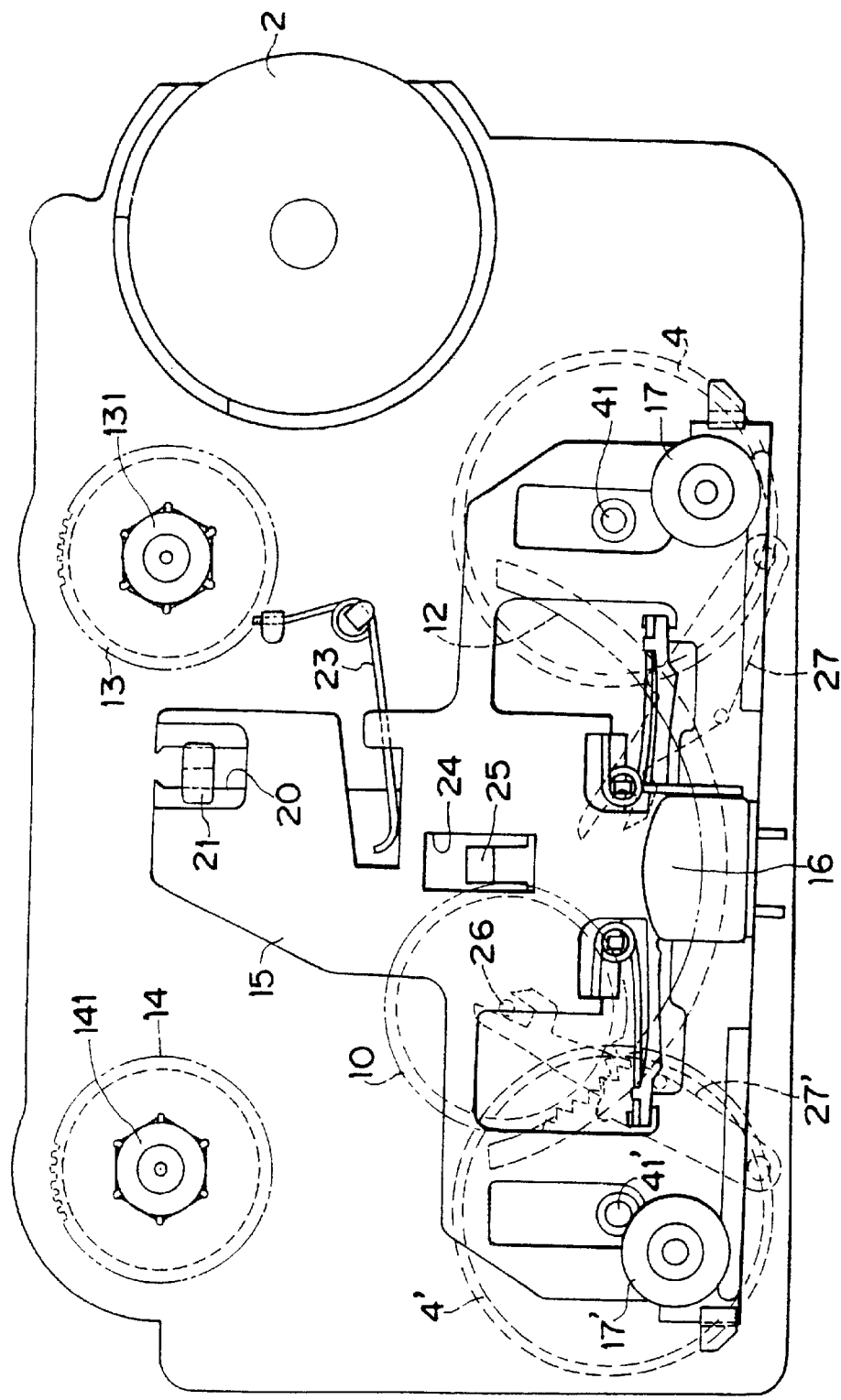
FIG. 8 is a plan view of the cassette tape recorder of FIG. 1 in which the head base is retained in a left upward lock position.
Figure 9:
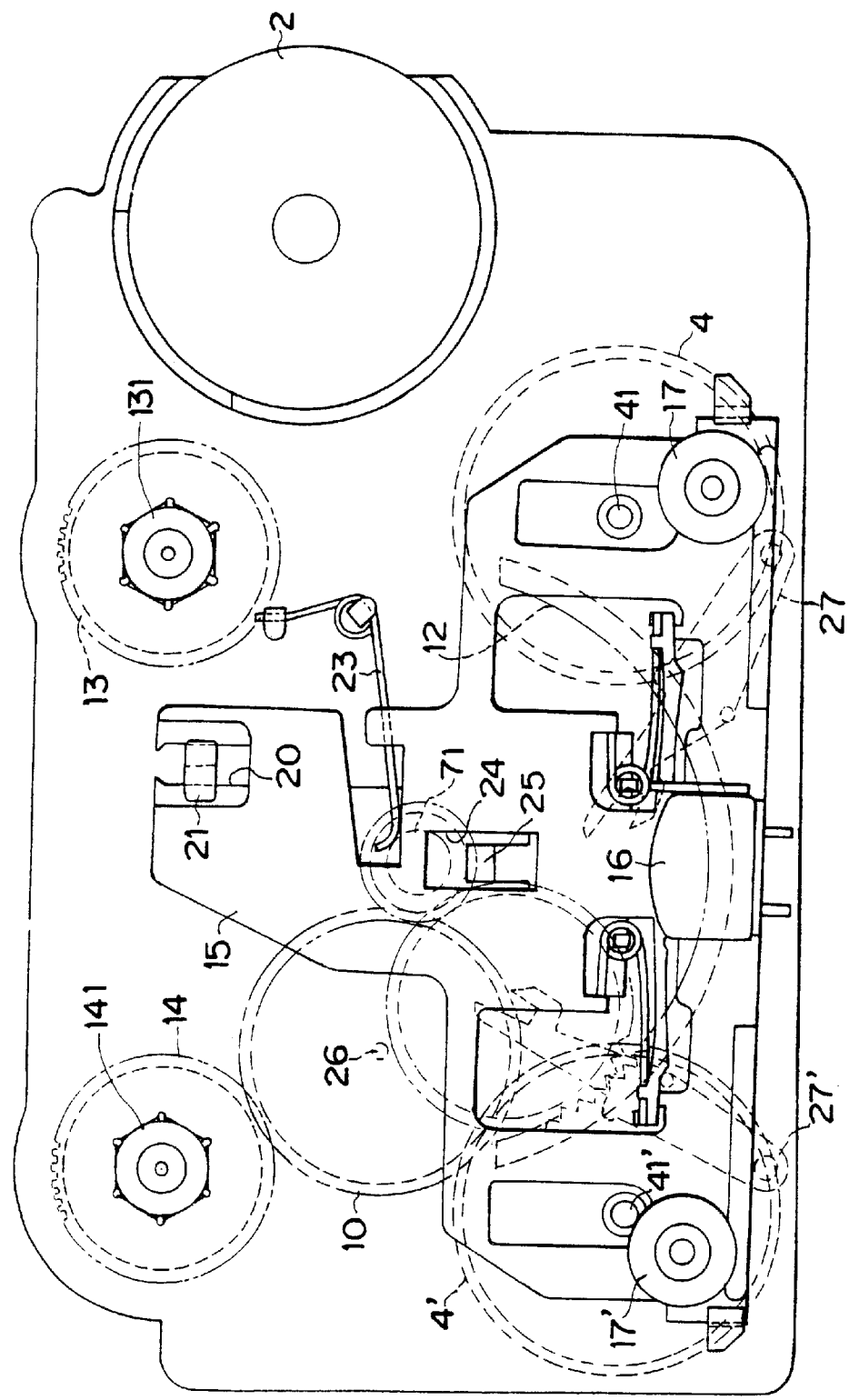
FIG. 9 is a plan view of the cassette tape recorder of FIG. 1 which is ready for reverse play.

Movement of head base 15 from the stand-by position of FIGS. 1 and 2 to the reverse operative position of FIG. 8 is substantially symmetric with movement from the stand-by position to the forward operative position of FIG. 5, which has been explained in detail in particular reference to FIG. 6. Briefly speaking, head base 15 is moved along with rotation of pin 26 in a direction opposite to the arrowed direction P in the sequential phases comprising:

(a') wherein it moves substantially along the center line X of chassis 1 as far as leg 211 of abutment piece 21 is engaged within the narrowed channel of guide groove 20;

(b') wherein it slightly rotates counterclockwise about projection 39 in guide groove 29 until leg 211 contacts the righthand edge of groove 20;

(c') wherein it moves in a predetermined slanted orientation defined by engagement between leg 211 and the lefthand edge of groove 20 until pinch roller 17' becomes in contact with capstan 41';

(d') wherein it slightly rotates counterclockwise about a contact point between pinch roller 17' and capstan 41' to separate leg 211 from the lefthand edge of groove 20 until projection 39 reaches the upper extreme end of groove 29; and (e') wherein it slightly rotates clockwise again about projection 39 in the upper extreme end of groove 29 to strengthen a contact pressure between pinch roller 17' and capstan 41' until it is locked in the reverse operative position of FIG. 8.

After the phase (e'), head base 15 is held in the reverse operative position of FIG. 8 even by further clockwise rotation of pin 26 so that the tape recorder is ready for the reverse play operation as shown in FIG. 9.

In the illustrated embodiment, each of forked ends 271, 271' of lock arms 27, 27' has an inner smaller projection 274 opposite to outer greater projection 273 (FIG. 4). If motor 2 should turn to rotate in a reverse direction, by malfunction or any other reason, after lock pin 272 has been engaged with recess 331 but before pin 26 climbs over outer projection 273 during movement of head base 15 from the stand-by position of FIGS. 1 and 2 toward the forward operative position of FIG. 5, pin 26 which now rotates clockwise toward the neutral position pushes inner projection 274 to unlock lock arm 27.

In the present invention, head base 15 carries pinch rollers 17, 17' at opposite sides of head 16 in a symmetric manner. Accordingly, it is required to move head base 16 in either of rightward and leftward slanted orientation to establish contact between only one pinch roller 17, 17' and its relevant capstan 41, 41'. This can be achieved in the present invention by imparting the upward elevating force to head base 15 at a point offset from the center line X. In some case, however, it may be preferable to provide means for switching the slanted orientation of head base 15 without fail.

Figure 10:
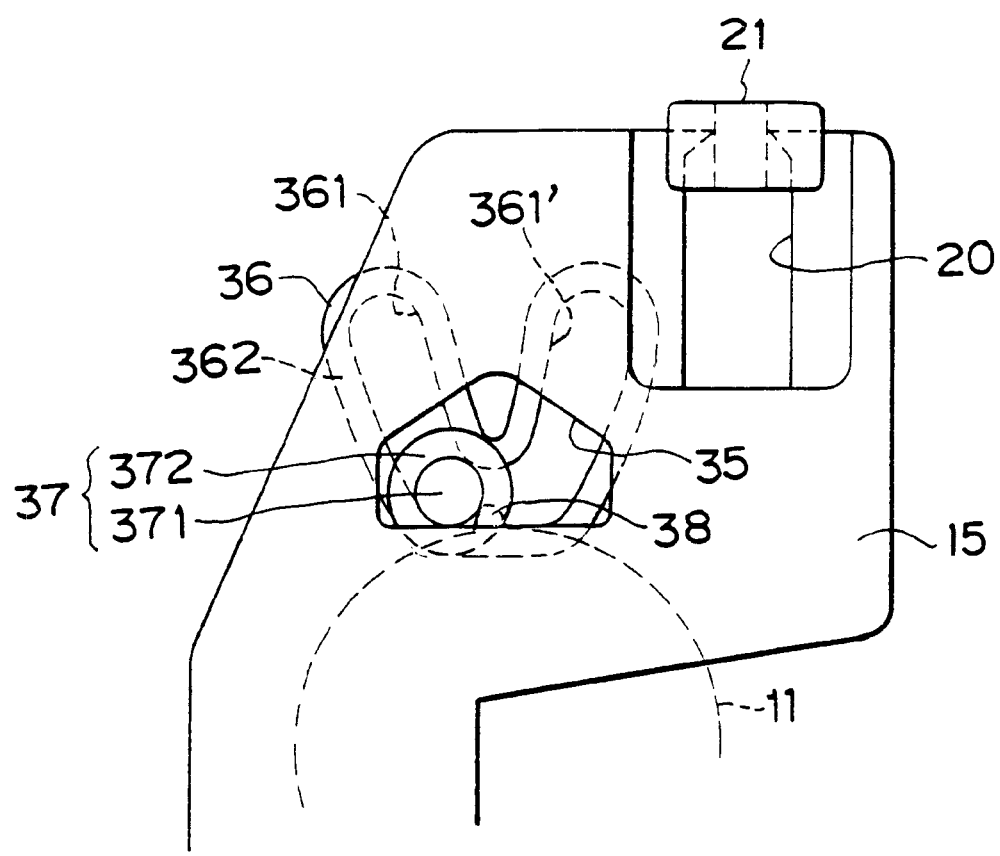
FIG. 10 is a partial plan view of the cassette tape recorder in accordance with a modified embodiment of the present invention.

FIG. 10 shows a modification in which an example of the above-described switch means is incorporated. At the upper end portion of head base 15 is formed an opening 35 like a baseball home plate, whereas chassis 1 has a forked guide groove 36 having a pair of oppositely elongated inclined grooves 361, 361'. A select boss 37 is composed of a cylinder 371 received in opening 35 and guide groove 36 and a rim 372 supported on a recessed surface 362 around guide groove 36, so that it may be slid along guide groove 36 while being accommodated in opening 35. In this embodiment, switch arm 11 has a projection 38 in opposition to pin 26, which is engageable with cylinder 371 of select boss 37.

FIG. 10 shows the positional relationship relevant to that in FIG. 1, that is, in the stand-by position wherein pin 26 is engaged with neither of forked ends 271, 271' of lock arms 27, 27'. In this position, projection 38 of switch arm 11 lies along the center of opening 35 and guide groove 36 (in alignment with the center line X of chassis 1), and cylinder 371 of select boss 37 is positioned at the lower extreme end of one of inclined grooves 361, 361' in engagement with projection 38. In FIG. 10, select boss 37 is shown as being positioned at the lower extreme end of the lefthand inclined groove 361.

When motor 2 rotates in a forward direction to rotate switch arm 11 counterclockwise from the position shown in FIG. 10, in the same manner as described before with regard to the previous embodiment, lock arm 27 is caused by engagement between pin 26 and outer projection 273 to rotate clockwise about shaft 28 so that head base 15 is moved upward in a righthand slanted orientation from the stand-by position of FIGS. 1 and 2 toward the tape running plane T by engagement between lock pin 272 and press arm 33. When head base 15 begins to elevate from the stand-by position, cylinder 371 has already been positioned in the lowermost position of lefthand inclined groove 361, which makes sure that head base 15 is moved in a specific slanted orientation defined by an angle of elongation of groove 361. Cylinder 371 moves along groove 361 along with movement of head base 15, and reaches near the uppermost position of groove 361 when head base 15 takes the forward operative position (FIG. 5).

Figure 11:
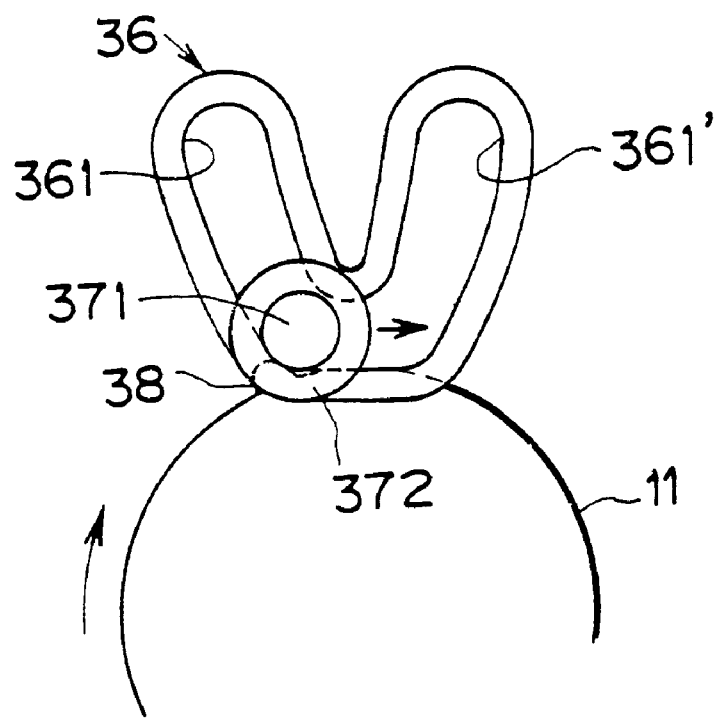
FIG. 11 is an explanatory view showing the manner of movement of a select boss in FIG. 10.

When motor 2 turns to rotate in a reverse direction after the forward play operation is completed, lock arm 27 is released and head base 15 is returned in an instant toward the stand-by position by the downward biasing force of spring 23. Accordingly, cylinder 371 is moved to the lowermost position of lefthand groove 361. Switch arm 11 and transmission gear 10 are moved toward the neutral position of FIG. 2. Just before switch arm 11 reaches the neutral position, projection 38 becomes into engagement with cylinder 371 and, therefore, moves select boss 37 to the right, as shown in FIG. 11. This makes sure that select boss 37 has already been positioned at the lowermost position of righthand inclined groove 361', before switch arm 11 begins to rotate clockwise from the neutral position of FIG. 2 to elevate head base 15 toward the reverse operative position of FIG. 8. Such movement of head base 15 is guided by cylinder 371 of select boss 37 which moves along righthand inclined groove 361'.

Figure 12:
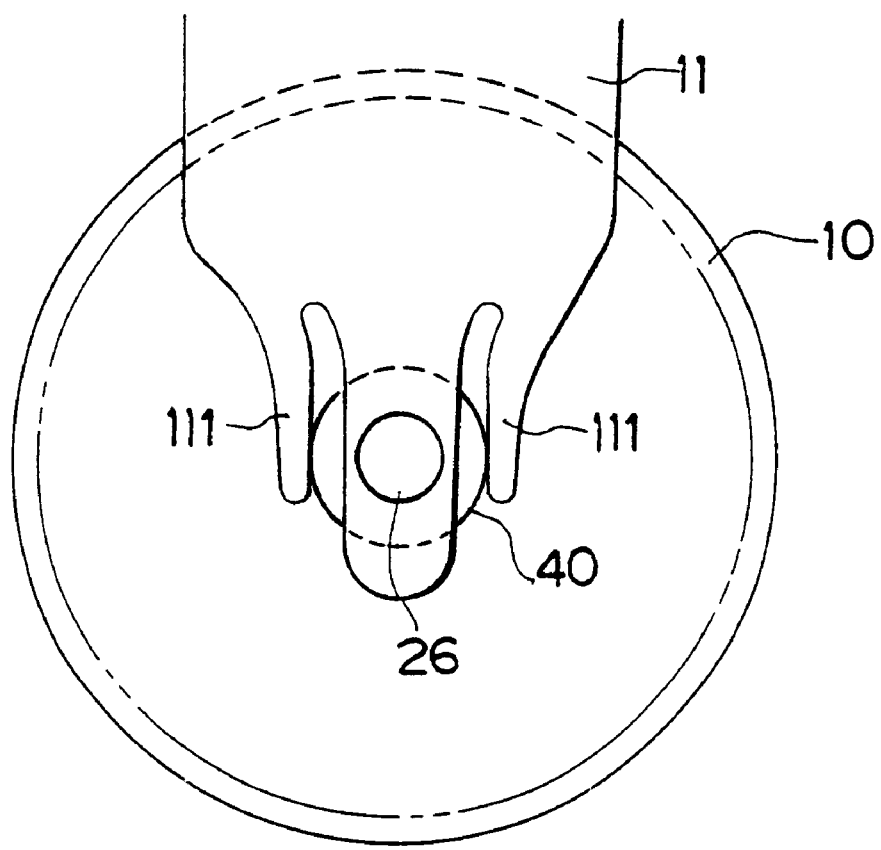
FIG. 12 is an explanatory view of a modified embodiment which relates to a rotary arm and a rotation transmission gear.

FIG. 12 shows a modified arrangement regarding switch arm 11 and transmission gear 10. More specifically, transmission gear 10 has an integral coaxial boss 40 which is elastically engaged between a pair or opposed arms 111, 111 formed integral with the leading end of switch arm 11. An elastic force imparted by arms 111, 111 to boss 40 acts as resistance to rotation of transmission gear 10, which invites switch arm 11 to rotate about shaft 71 in a direction opposite to that of rotation of transmission gear 10. This makes sure that transmission gear 10 becomes into mesh with reel bed gear 13, 14 soon after separating from the extreme end of inner gear 12.

In a still modified arrangement, a leaf spring or other elastic or resilient member is fitted between transmission gear 10 and switch arm 11 to rotate transmission gear 10 in unison with switch arm 11 when it is not in mesh with inner gear 10 and reel bed gear 13, 14.

Figure 13:
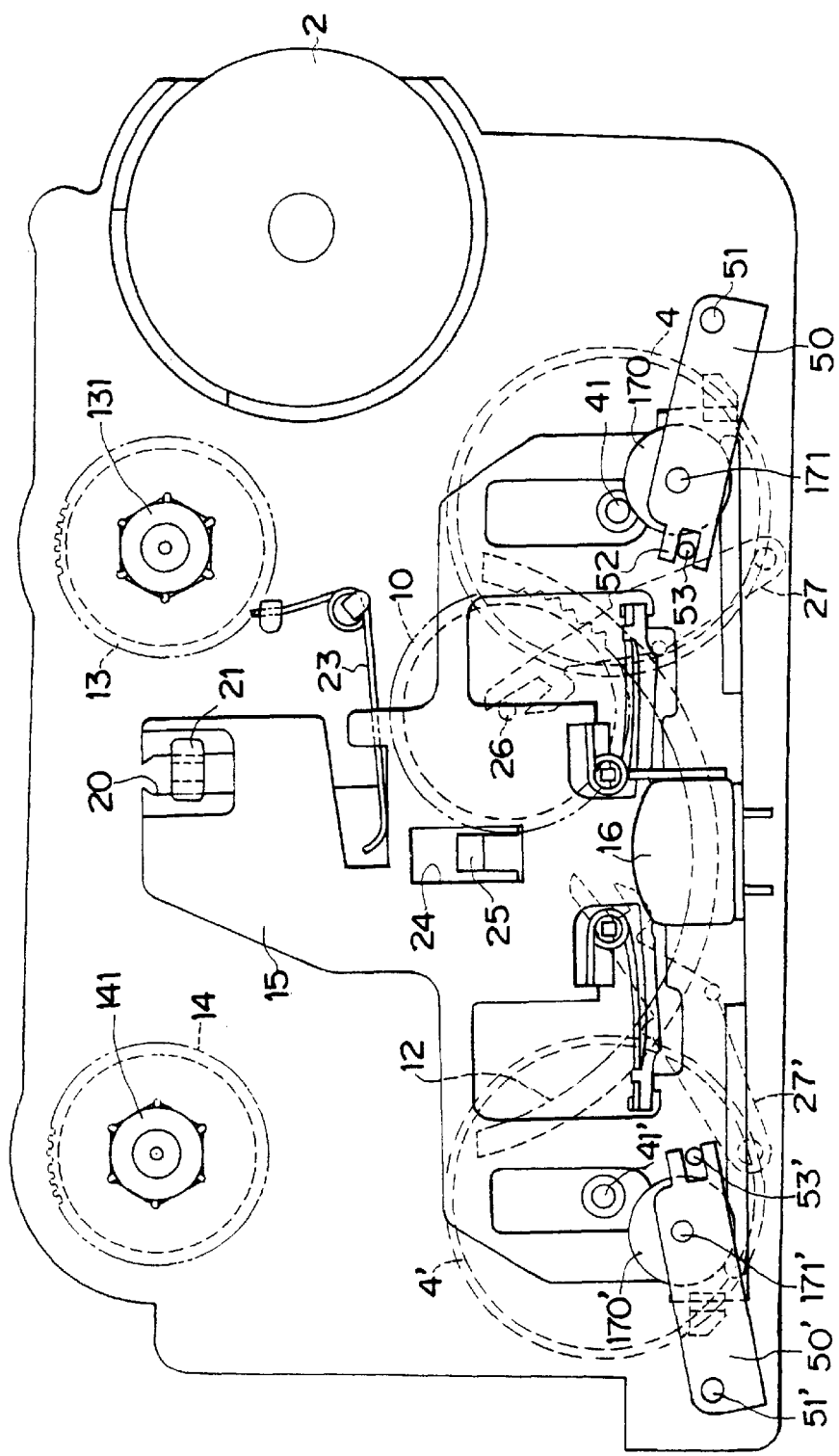
FIG. 13 is a plan view of the cassette tape recorder according to another embodiment of the present invention in which the head base is retained in a right upward lock position.

In the foregoing embodiments, a pair of pinch rollers 17, 17' is supported on head base 15 at opposite sides of head 16. However, as shown in FIG. 13, a pair of pinch rollers 170 ,170' may be supported by pinch roller bases 50, 50' respectively which may be rotated in response to movement of a head base 15 carrying a head base 16 only. In the embodiment shown in FIG. 13, pinch roller bases 50, 50' are rotatable about shafts 51, 51' planted on a chassis 1. Each pinch roller base 50, 50' has a forked end 52, 52' which engages a pin 53, 53' upstanding from the surface of head base 15. With these arrangement, elevation of head base 15 in a slanted orientation causes one of pinch roller bases 50, 50' to rotate about shaft 51, 51', so that pinch roller 171, 171' supported thereon approaches its corresponding capstan 41, 41'. FIG. 13 shows that head base 15 is retained at a predetermined lock position in a rightward slanted orientation and pinch roller 171 is in press-contact with capstan 41 for forward play operation, which should be equivalent to FIG. 5 in the previous embodiment.

Although the present invention has been described and illustrated in conjunction with specific embodiments thereof, it is to be understood that the present invention is not limited to these embodiments and involves various changes and modifications within the spirit and scope of the invention defined in the appended claims. For example, a combination of projection 39 on the underside of head base 15 and guide groove 29 on the surface of chassis 1 may be replaced with a projection on the surface of chassis 1 and a guide groove on the underside of head base 15 for engagement with the projection. In this arrangement, the projection is formed along the center line X of chassis 1 and acts as a pivot of rotation of head base 15 during its movement.

What is claimed is:

1. A cassette tape recorder of automatic reverse type, comprising a motor rotatable in opposite directions; a chassis; a pair of capstans driven by said motor to rotate in forward and reverse directions; a head base slidably mounted on said chassis and carrying at least a head substantially at a center of said head base; a pair of pinch rollers for forward play and reverse play arranged in substantially symmetric design at opposite sides of said head; a spring for biasing said head base toward a stand-by position remote from a tape running plane defined by said capstans; a pair of engagement members engageable with said head base at points offset from a center line of said chassis; and a rotation transmission for moving one of said engagement members, selected depending upon a direction of rotation of said motor, while in engagement with said head base at an offset point, thereby moving said head base from the stand-by position toward a tape running plane, wherein said head base at the stand-by position is shifted toward the tape running plane, against the biasing force of said spring, in one of first and second predetermined slanted orientations due to engagement with the selected engagement member, so that one of said pinch rollers is pressed against a corresponding one of said capstans, while the other pinch roller remains uncontact with the other capstan.

2. A cassette tape recorder of automatic reverse type according to claim 1 wherein said chassis has a longitudinal groove along its center axis, into which a projection on the bottom of said head base is received, so that, while said head base is moved from the stand-by position toward the tape running plane, said projection moves along said groove and acts as a pivot for slight rotation of said head base to guide said head base to be shifted toward the tape running plane in said predetermined slanted orientation.

3. A cassette tape recorder of automatic reverse type according to claim 1 wherein said chassis has a projection on its center axis, which is received in a longitudinal groove on the top surface of said head base, so that, while said head base is moved from the stand-by position toward the tape running plane, said projection moves along said groove and acts as a pivot for slight rotation of said head base to guide said head base to be shifted toward the tape running plane in said predetermined slanted orientation.

4. A cassette tape recorder of automatic reverse type according to claim 2 wherein said projection acts as a pivot for rotation of said head base at an extreme position in said longitudinal groove, which increases a contact pressure between said selected pinch roller and its corresponding capstan opposed thereto and, at the same time, separates the other pinch roller from its corresponding capstan.

5. A cassette tape recorder of automatic reverse type according to claim 1 which further comprises guide means for allowing slight rotation of said head base during movement from the stand-by position toward the tape running plane, said guide means comprising an upstanding member on said chassis and a guide groove formed at an upper end portion of said head base for receiving said upstanding member with a play in width.

6. A cassette tape recorder of automatic reverse type according to claim 5 wherein said upstanding member engages a first edge of said guide groove while said head base moves in said first predetermined slanted orientation, whereas it engages a second edge of said guide groove, opposite to said first edge, while said head base moves in a said second predetermined slanted orientation, whereby an angle of oblique direction of movement of said head base is defined by engagement of said upstanding member and one of opposite edges of said guide groove.

7. A cassette tape recorder of automatic reverse type according to claim 6 wherein said rotation transmission still operates to move said head base after said selected pinch roller becomes in contact with its corresponding capstan, so that said head base tends to rotate, substantially about a contact point between said selected pinch roller and said capstan, thereby releasing said upstanding member from contact with said edge of said guide groove.

8. A cassette tape recorder of automatic reverse type according to claim 1 wherein said rotation transmission comprises a switch arm driven by said motor to swing about a pivot on the center axis of said chassis, a pair of operating arms arranged symmetrically at opposite sides of the center axis of said chassis, each operating arm having a pivot base end and a leading end engageable with an end portion of said switch arm and including said engagement member, so that, when said switch arm swings in one direction, one of said operating arms rotates due to engagement between the leading end of said operating arm and the end portion of said switch arm, which, in turn, moves said head base due to engagement with said engagement member of said operating arm.

9. A cassette tape recorder of automatic reverse type according to claim 8 which further comprises lock means for retaining said head base in a lock position where one of said pinch rollers is in press-contact with its corresponding capstan, wherein each of said operating arm has a forked leading end with an inner projection and an outer projection of greater extension than said inner projection, the end portion of said switch arm being engaged with said out projection while said head base is moved from the stand-by position toward the tape running plane, whereas the end portion of said switch arm being engaged with said inner projection to unlock said head base from the lock position defined by said lock means.

10. A cassette tape recorder of automatic reverse type according to claim 1 wherein said chassis has a guide opening having a base end portion and a pair of oblique grooves extending from said base end portion in opposite oblique directions to separate from each other as they extend, there is further provided a select boss movably received within said guide opening, said select boss being provided with a projection driven by said motor to move said select boss within said base end portion toward one of the oblique grooves, thereby specifying one of said first and second predetermined slanted orientations during movement of said head base from the stand-by position.

11. A cassette tape recorder of automatic reverse type according to claim 10 wherein said rotation transmission means comprises a switch arm driven by said motor to swing about a pivot on the center axis of said chassis, and a pair of operating arms arranged symmetrically at opposite sides of the center axis of said chassis, each operating arm having a pivot base end and a leading end engageable with a first end portion of said switch arm and including said engagement member, said projection that moves said select boss being formed as a second end portion of said switch arm opposite to said first end portion.

* * * * *